US011889262B2

(12) United States Patent
Hardie et al.

(10) Patent No.: US 11,889,262 B2
(45) Date of Patent: Jan. 30, 2024

(54) IN-EAR AUDIO SYSTEM

(71) Applicant: Epix Audio, LLC, Round Rock, TX (US)

(72) Inventors: Rocky Lain Hardie, Austin, TX (US); Hyeon Lee, Leander, TX (US)

(73) Assignee: Epix Audio, LLC, Round Rock, TX (US)

( * ) Notice: Subject to any disclaimer, the term of this patent is extended or adjusted under 35 U.S.C. 154(b) by 0 days.

(21) Appl. No.: 18/174,761

(22) Filed: Feb. 27, 2023

(65) Prior Publication Data

US 2023/0224632 A1 Jul. 13, 2023

Related U.S. Application Data

(63) Continuation of application No. 17/248,741, filed on Feb. 5, 2021, now Pat. No. 11,595,755.

(60) Provisional application No. 62/970,813, filed on Feb. 6, 2020.

(51) Int. Cl.
*H04R 1/34* (2006.01)
*H04R 1/10* (2006.01)
*H04R 1/24* (2006.01)

(52) U.S. Cl.
CPC ........... *H04R 1/345* (2013.01); *H04R 1/1016* (2013.01); *H04R 1/24* (2013.01)

(58) Field of Classification Search
CPC ......... H04R 1/345; H04R 1/1016; H04R 1/24
See application file for complete search history.

(56) References Cited

U.S. PATENT DOCUMENTS 5,729,605 A * 3/1998 Bobisuthi ............ H04R 1/1041 379/433.02
9,516,403 B2 * 12/2016 Huang ................. H04R 1/1075
9,532,133 B2 * 12/2016 Huang ..................... H04R 1/10
9,571,933 B2 * 2/2017 Pan ........................ H04R 5/033
9,807,525 B2 * 10/2017 van Halteren ......... H04R 25/48
10,433,077 B2 * 10/2019 Andersen ............. H04R 25/554
2009/0116676 A1 * 5/2009 Welsh ...................... H04R 1/24 381/380
2009/0147981 A1 * 6/2009 Blanchard ............ H04R 1/1075 381/380
2009/0220113 A1 * 9/2009 Tiscareno ............. H04R 11/02 381/380
2011/0158440 A1 * 6/2011 Mei ...................... H04R 1/1075 381/309
2014/0140565 A1 * 5/2014 Liu .......................... H04R 1/26 381/380
2014/0205131 A1 * 7/2014 Azmi ................... H04R 1/1066 381/380
2016/0205458 A1 * 7/2016 Huang ................. H04R 1/1016 381/380
2019/0158944 A1 * 5/2019 Belonozhko ............. H04R 3/14

(Continued)

OTHER PUBLICATIONS

Office Action for U.S. Appl. No. 17/248,741, dated Jun. 9, 2022, Hardie, "In-Ear Audio System", 12 Pages.

*Primary Examiner* — Oyesola C Ojo
(74) *Attorney, Agent, or Firm* — Lee & Hayes, P.C.

(57) ABSTRACT

Techniques are described for an in-ear audio system that delivers high quality sound into an ear canal of the user using two or more waveguides. Each of the waveguides may deliver sound output by individual drivers to a consolidation zone. The sound may be mixed at the consolidation zone and delivered to the ear canal of the user.

20 Claims, 9 Drawing Sheets

(56) References Cited

U.S. PATENT DOCUMENTS

| | | | | |
|---|---|---|---|---|
| 2019/0253783 | A1* | 8/2019 | O'Callaghan | H04R 1/1058 |
| 2019/0261078 | A1* | 8/2019 | Ouchi | H04R 1/1016 |
| 2021/0127199 | A1* | 4/2021 | Clark | H04R 1/2888 |

* cited by examiner

IN-EAR AUDIO SYSTEM

CROSS-REFERENCE TO RELATED APPLICATION

This application is a continuation of and claims priority to U.S. application Ser. No. 17/248,741, filed on Feb. 5, 2021 and entitled "IN-EAR AUDIO SYSTEM," issuing as U.S. Pat. No. 11,595,755 on Feb. 28, 2023, which is a non-provisional of claims priority to U.S. Provisional Application No. 62/970,813, filed on Feb. 6, 2020 and entitled "IN-EAR AUDIO SYSTEM," which are incorporated by reference herein in their entirety.

BACKGROUND

Digital in-ear audio devices have become more and more popular. While the digital in-ear audio devices generate high sound quality, the digital in-ear audio devices are difficult to manufacture and expensive due to the large number of electronic components and the relatively small size or form factor of the in-ear audio devices. Therefore, an easier to manufacture and less expensive in-ear audio system that maintains a high quality of sound is desirable.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
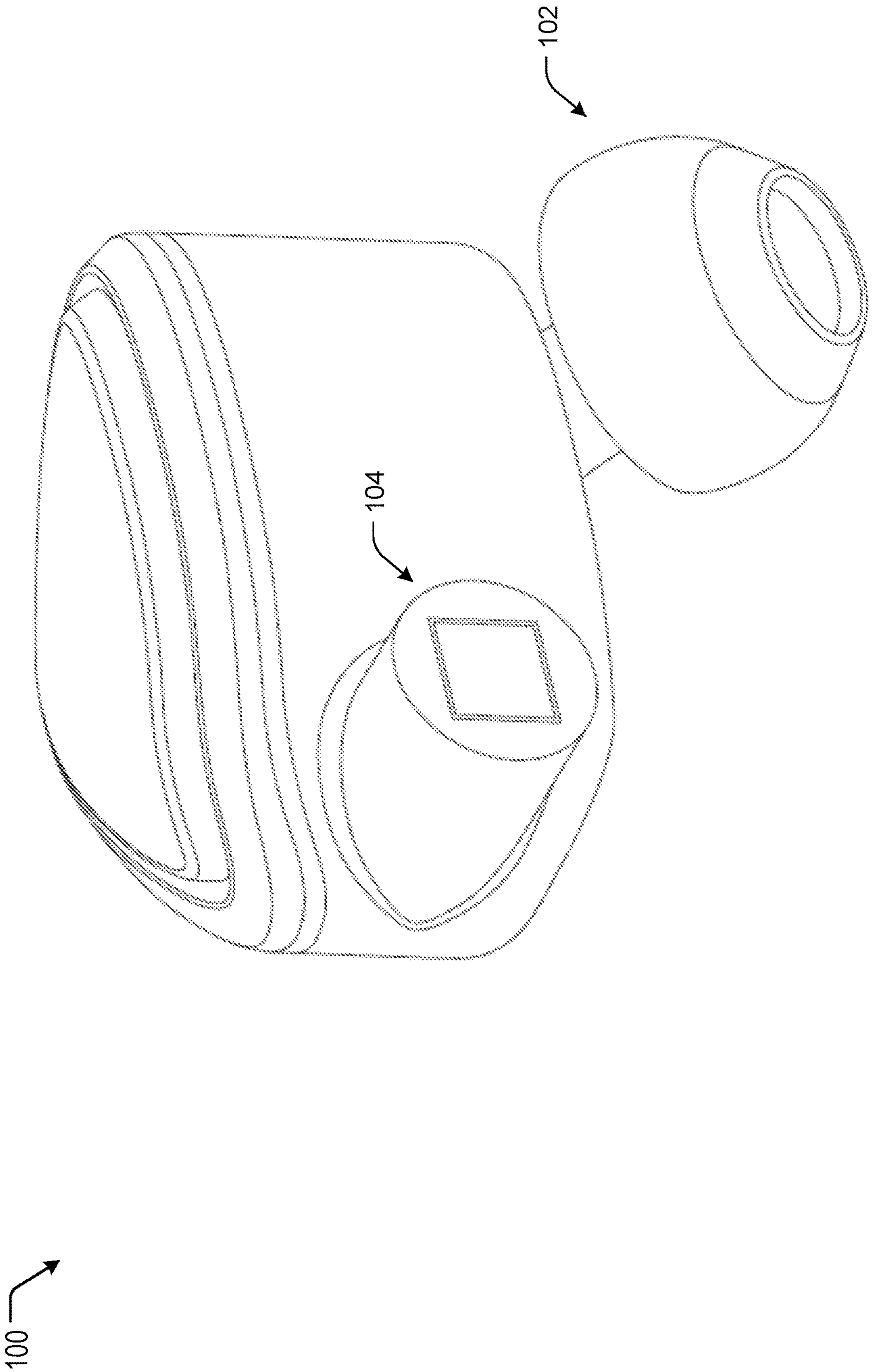
FIG. 1 is an example pictorial view of an in-ear audio system, according to some implementations.

Described herein is an in-ear audio system or earbud that is configured to produce a high quality audio output using a physical geometry of open or empty regions within the interior of the casing of the in-ear audio system in lieu of expensive digital audio components. In some implementations, the in-ear audio system may include a set of drivers (such as three drivers, five drivers, seven drivers, or the like) arranged to output sound based on an audio output signal. For example, the drivers may include a bass driver, at least one high frequency driver and at least one mid frequency driver.

In some cases, the bass driver may be configured to output sound into a first waveguide. The at least one high frequency driver and the at least one mid frequency driver may be configured to output sound into a second waveguide. For example, the first waveguide may have a first end physically proximate to the bass driver and a second end. Likewise, the second waveguide may have a first end physically proximate to the high frequency and mid frequency drivers and a second end. The first and second waveguides may then both be communicatively coupled to a consolidation zone or chamber. The consolidation zone may then be communicatively coupled a sound tube that conducts or directs the consolidated sound (e.g., the sound output by the bass driver, the high frequency drivers, and the mid frequency drivers) to an ear canal of the user.

In one implementation, the first waveguide associated with the bass driver may have a diameter of approximately 4.51 millimeter (mm) at the first end. The diameter of the first waveguide may taper to approximately 0.84 mm. The length of the first waveguide from a center point of the first end to the interior edge of the second end may be approximately 6.9 mm. The length of the first waveguide from an exterior point along the edge of the first end to an exterior point along the edge of the second end may be approximately 9.53 mm. The length of the first waveguide from an interior point along the edge of the first end to an interior point along the edge of the second end may be approximately 5.36 mm.

The first waveguide may also include a first angle at the exterior point. The first angle may be between a side wall and the top opening exposed to the bass driver at the first end. The first waveguide may also include a second angle at an interior point. The second angle may also be between a side wall and the top opening exposed to the bass driver at the second end. The first angle may be approximately 20.9 degrees and the second angle may be approximately 140.4 degrees. In some example, the second angle may be between approximately 39.6 degrees and 140.4 degrees In other examples, the first waveguide may be substantially oval, ellipsoid, or otherwise elongated along one dimension (such as the x or y dimension). In this example, the first waveguide may have a shortest distance between the opposing surfaces of approximately 0.84 mm and a longest distance of approximately 1.53 mm. In some cases, the length of the first waveguide from the center point of the first end to the interior edge of the second end may be between approximately 6.7 mm and 7.2 mm. The length of the first waveguide from the exterior point along the edge of the first end to the exterior point along the edge of the second end may be between approximately 9.25 mm and 9.75 mm. The length of the first waveguide from the interior point along the edge of the first end to the interior point along the edge of the second end may be between approximately 5.1 mm and 5.5 mm. In these examples, the first angle may be between approximately 20.0 degrees and 21.2 degrees and the second angle may be between approximately 39.6 degrees and 69.15 degrees.

In one implementation, the second waveguide associated with the high frequency drivers and the mid frequency drivers may have a diameter of approximately 4.51 millimeter (mm) at the first end. The second waveguide may also have a first opening along the top surface that is approximately 1.73 mm for the high frequency drivers and a second opening along the top surface that is approximately 1.63 mm for the mid frequency drivers. In some cases, the distance between the first opening and the second opening may be 2.0 mm. In some examples, the size of the first opening may vary between approximately 1.6 mm and 1.8 mm, the size of the second opening may vary between approximately 1.5 mm and 1.7 mm, and the distance between the opening may vary between approximately 1.9 mm and 2.1 mm.

The diameter of the second waveguide may taper to approximately 1.2 mm at the second end, such that the diameter is between approximately 1.2 mm and approximately 2.14 mm. The length of the second waveguide from an interior point of the first end to the interior edge of the second end may be approximately 5.15 mm. The length of the second waveguide from an exterior point along the edge of the first end to an exterior point along the edge of the second end may be approximately 3.36 mm. In some cases, the length of the second waveguide from the exterior point along the edge of the first end to the exterior point along the edge of the second end may be between approximately 4.15 mm and 6.15 mm. The length of the second waveguide from the interior point along the edge of the first end to the interior point along the edge of the second end may be between approximately 2.36 mm and 4.36 mm.

The second waveguide may also include a first angle at the exterior point. The first angle may be between a side wall and the top opening exposed to the bass driver at the first end. The second waveguide may also include a second angle at an interior point. The second angle may also be between a side wall and the top opening exposed to the bass driver at the second end. The first angle may be approximately 38.9 degrees and the second angle may be approximately 93.1 degrees. In some examples, the first angle may be between approximately 35.0 degrees and 41 degrees and the second angle may be between approximately 90.0 degrees and 96.0 degrees.

In some cases, the second waveguide may be bifurcated or a dividing wall may separate the sound output by the high frequency driver from the sound output by the mid frequency driver. The angle of the dividing wall with respect to the high frequency drivers may be 51.1 degrees. In some cases, the angle of the dividing wall respect to the high frequency drivers may be between 45.0 degrees and 55.0 degrees. In the case of the dividing wall, the second waveguide may have a first opening proximate to the consolidation zone for the sound output by the high frequency drivers and a second opening proximate to the consolidation zone for the sound output by the mid frequency drivers.

As discussed above, the first waveguide and the second waveguide may communicatively couple to the consolidation zone. The opening to the consolidation zone, including the opening of the first waveguide and the opening of the second waveguide, may be approximately 2.24 mm. In some cases, the opening to the consolidation zone, including the opening of the first waveguide and the opening of the second waveguide, may be between approximately 1.24 mm and 3.24 mm. The consolidation zone may allow for the mixing of the sound output by each of the drivers prior to being delivered to the ear canal of the user via, for instance, and ear tube.

In some cases, both the first and second waveguides may be conical in shape and include a taper towards the consolidation zone. In these cases, the consolidation zones and/or waveguides may be formed to tightly seal around the respective drivers to reduce leakage toward the cap and to assist in radiating the output sound towards the sound tube.

In the configuration discussed above, the bass driver of the dynamic type (DD) is mechanically isolated from the other drivers such that the outputted sound is radiated into a first waveguide or a condenser waveguide separate from the sound output by the other drivers. In some cases, the high frequency drivers may include a tweeter driver positioned between the bass driver and the mid frequency drivers. The tweeter driver may radiate the outputted sound into a side wall of the second waveguide to cause the sound output by the tweeter driver to bleed acoustic energy. In this manner, the high-end frequencies of the sound output by the tweeter does not become over driven or bright. At the same time, the mid frequency drivers may include a midrange balanced armature driver (SWFK) that radiates sound directly into the cavity of the consolidation zone via the angle of the exterior wall, the dividing wall of the second waveguide. In some cases, the high frequency drivers may also be positioned to radiate an output directly into the cavity of the consolidation zone.

The configuration, discussed above, of driver and waveguides results in an amount of acoustic energy greater than a threshold amount within the vocal ranges and, thus, helps the user or listener to more easily identify the sounds within the desired vocal ranges (e.g., spoken words).

In some implementations, the in-ear audio system may include an irregular shape to reduce the possibility of standing waves within the system. For example, as shown below, a waveform or other non-uniform design may be used along the cap to reduce the possibility of standing waves and, thereby, further reduce any back volume or background noise within the system. The implementation herein employs waveguides, back volumes, consolidation areas and a sound tube diameter (such as between 0.5 and 1 mm, 1.5 mm, between 1 and 2 mm, etc.) and a predefined length (e.g., greater than 1 mm, greater than 2 mm, greater than 2 mm, etc.) to produce the desired sound quality. Further, this sound quality can be tailored for various audiences and musical tastes by modifying the shape and size of the consolidation zone, resonance chambers, and the sound tube. In some cases, the sound quality can be further tailored by adjusting the position, number, and relationship of the set of drivers.

In some examples, the desired sound quality may include a desired frequency response function, a desired or specific low frequency response, a flat broad band response, and/or a desired roll off at specific or designated higher frequencies (e.g., a reduction in amplitude or roll off for frequencies greater than a threshold frequency). In some cases, the desired sound quality may also include reducing or removing dips and peaks within the combined output sound exiting the sound tube. For example, a cutoff frequency (fc) of sound propagating in the waveguides may be defined as defined as $$fc=\zeta c/\eta D$$

where ζ: Bessel function coefficient, c: speed of sound propagation, and D: diameter of the waveguide. In one example, at a room temperature of 20° C. of room temperature, c and are 343 m/s and 1.84, respectively. The cutoff frequency for the bass audio driver (fcb) is approximately 44.6 kHz (Db of approximately 4.51 mm) As such, the first waveguide delivers sound in a desired frequency range of approximately 20 Hz to approximately 20 kHz. In this example, the first waveguide may transmit up to the second harmonic of the highest frequency of the range, e.g., approximately 40 kHz, without cutoff Adding harmonics of transmitting sound provides listeners spaciousness, thereby the capacity of the first waveguide to transmit harmonics alongside primary acoustic waves. In some cases, the acoustic waves or sound transmitted through the first waveguide are only low frequency sound, even higher order harmonics than the second order may be transmitted, thereby further increasing the spaciousness. In another example, the cutoff frequency for mid-range drivers with a waveguide having approximately 1.63 mm would be approximately 123 kHz and the second waveguide may transmit up to the 5th harmonics of the sound. In yet another example, the cutoff frequency for the high-frequency drivers with a waveguide having approximately 1.73 mm would be approximately 116 kHz and, again, the second waveguide may transmit up to the 5th harmonics of the sound.

FIG. 1 is an example pictorial view of an in-ear audio system 100, according to some implementations. The in-ear audio system 100 may be configured to receive an audio signal from an electronic device or other audio source and to output the audio signal into an ear canal of a user via the earpiece 102. In the current example, the in-ear audio system 100 may include an interface 104 for coupling to an electronic device or other audio source. In this example, the interface 104 may include a wired connection but it should be understood that, in some implementation, the interface may be a wireless connection interface.

Figure 2:
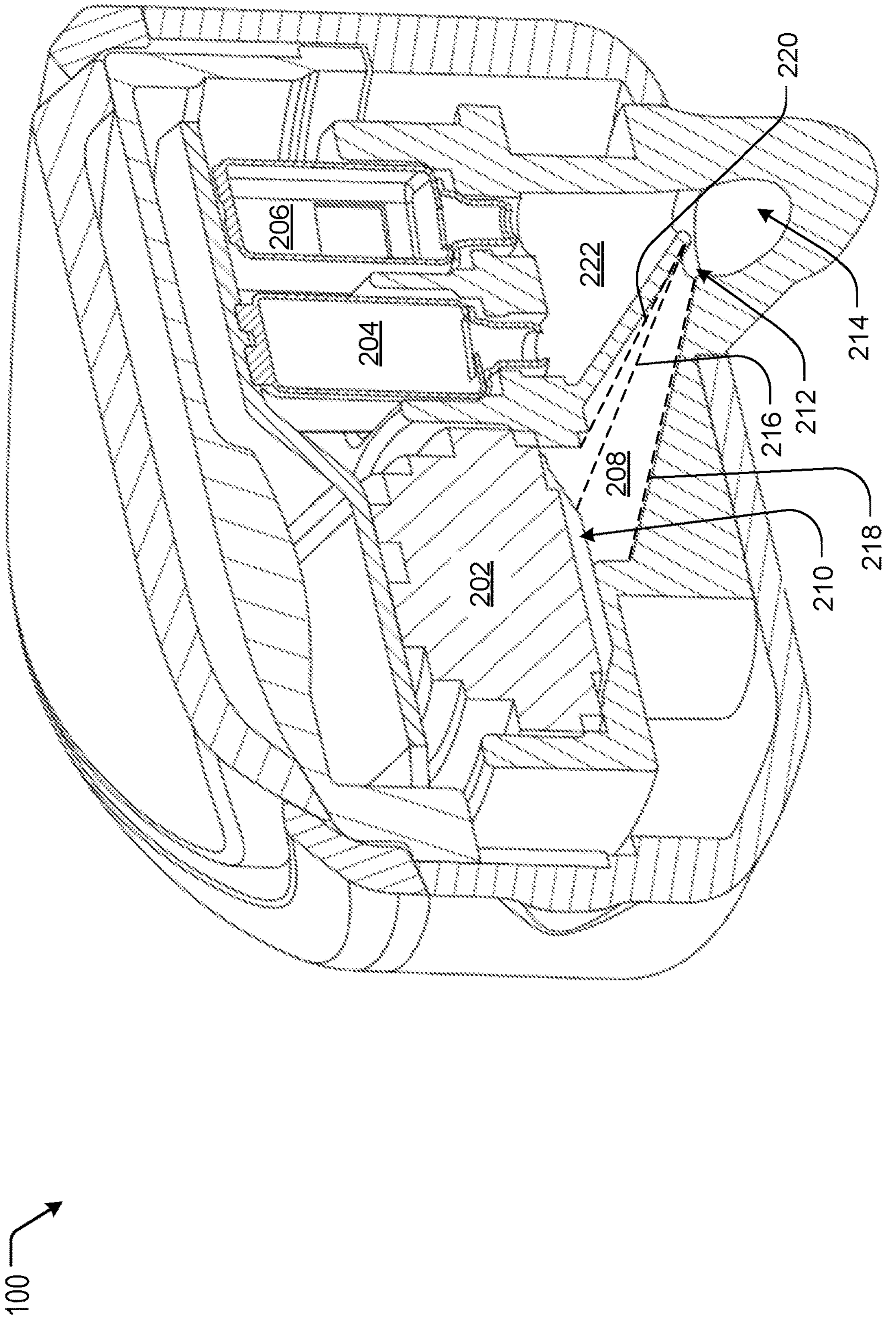
FIG. 2 is an example cross-sectional view of an in-ear audio system, according to some implementations.

FIG. 2 is an example cross-sectional view of an in-ear audio system 100, according to some implementations. In the illustrated example, the in-ear audio system 100 may include a bass driver 202, one or more high frequency drivers 204, and one or more mid-frequency drivers 206. For instance, the bass driver 202 may include one or more a dynamic driver and one or more high frequency drivers 204 an/or and the one or more mid-frequency drivers 206 may be balanced armatures. Each of the drivers 202-206 may output sound that is delivered to an ear canal of the user ultimately via a sound tube and earpiece 102 of FIG. 1.

In this example, the bass driver 202 is configured to initially output sound or acoustic energy into a first waveguide 208. The first waveguide 208 may be substantially conical in shape with a larger top section 210 physically proximate to the bass driver 202 and a smaller bottom section 212 positioned physical proximate or adjacent to a consolidation zone 214. The large top section 210 may include an opening to allow the sound or acoustic energy output by the bass driver 202 to enter the first waveguide 208. The opening may be approximately 4.51 mm in diameter. The smaller bottom section 212 may also be open to the consolidation zone 214 such that the sound or acoustic energy output by the bass driver 202 may transition or flow from the first waveguide 208 into the consolidation zone 214. The opening of the smaller bottom section 212 of the first waveguide 208 may be have a first dimension of approximately 0.84 mm and a second dimension of approximately 1.53 mm.

In the illustrated implementation, a distance, generally indicated by 216, of the first waveguide 208 from a center point of the larger top section 210 to the interior edge of the smaller end may be approximately 6.9 mm A distance 218 of from an exterior point along the edge of the larger top section 210 to an exterior point along the edge of the smaller bottom section 212 may be approximately 9.53 mm A distance 220 of the first waveguide 208 from an interior point along the edge of the larger top section 210 to an interior point along the edge of the smaller bottom section 212 may be approximately 5.36 mm.

In the current example, the high frequency drivers 204 and the mid-frequency drivers 206 may also output sound or acoustic energy into a second waveguide 222. The dimensions and characteristics of the second waveguide 222 are discussed in more detail below with respect to FIG. 3.

Figure 3:
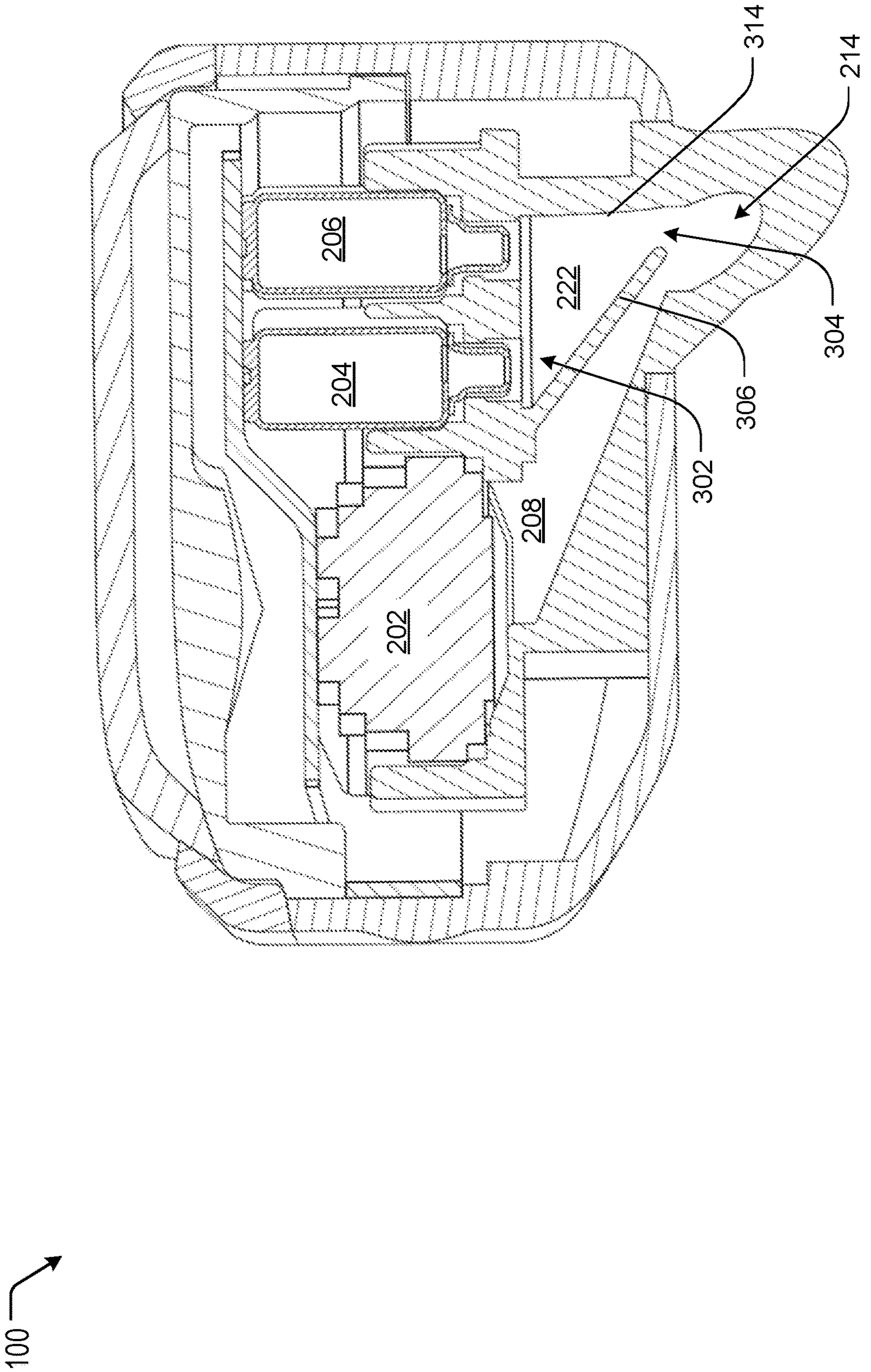
FIG. 3 is another example cross-sectional view of an in-ear audio system, according to some implementations.

FIG. 3 is another example cross-sectional view of an in-ear audio system 100, according to some implementations. As discussed above, the in-ear audio system 100 includes a bass driver 202, a high frequency driver 204, and a mid-frequency driver 206 to, respectively, output sound or acoustic energy into a first waveguide 208 and a second waveguide 222.

In the current example, the second waveguide 222 may be substantially conical and taper in a manner similar to the first waveguide 208. For example, the second waveguide 222 may include a larger top section 302 and a smaller bottom section 304. The larger top section 302 may have a first opening such that the high frequency driver 204 may output the sound or acoustic energy into the second waveguide 222 and a second opening such that the mid-frequency driver 206 may also output sound into the waveguide 222. A diameter of the first opening may be approximately 1.73 mm and a diameter of the second opening may be approximately 1.63 mm. Likewise, the smaller bottom section 304 may have a second opening such that the sound or acoustic energy may flow to the consolidation zone 214 to mix with, for instance, the output of the bass driver 202. A diameter of the second opening may be between approximately 1.25 mm and approximately 2.14 mm. In some cases, the second opening may be ellipsoid in shape and have a longest length of approximately 2.14 mm and a shortest length of approximately 1.25 mm. In the illustrated example, a distance 306 from a point of along the edge of the opening of the larger top section 302 of the waveguide 222 to a point along the opening of the smaller bottom section 304 of the waveguide 222 may be approximately 5.15 mm.

In the current example, the acoustic energy output by the high frequency driver 204 may propagate along the wall 306 into the consolidation zone 214 and the acoustic energy output by the mid-frequency driver 206 may propagate along the wall 314, such that the angle of the walls 306 and 314 may cause a change in the strength of the acoustic energy being output prior to mixing in the consolidation zone 214.

Figure 4:
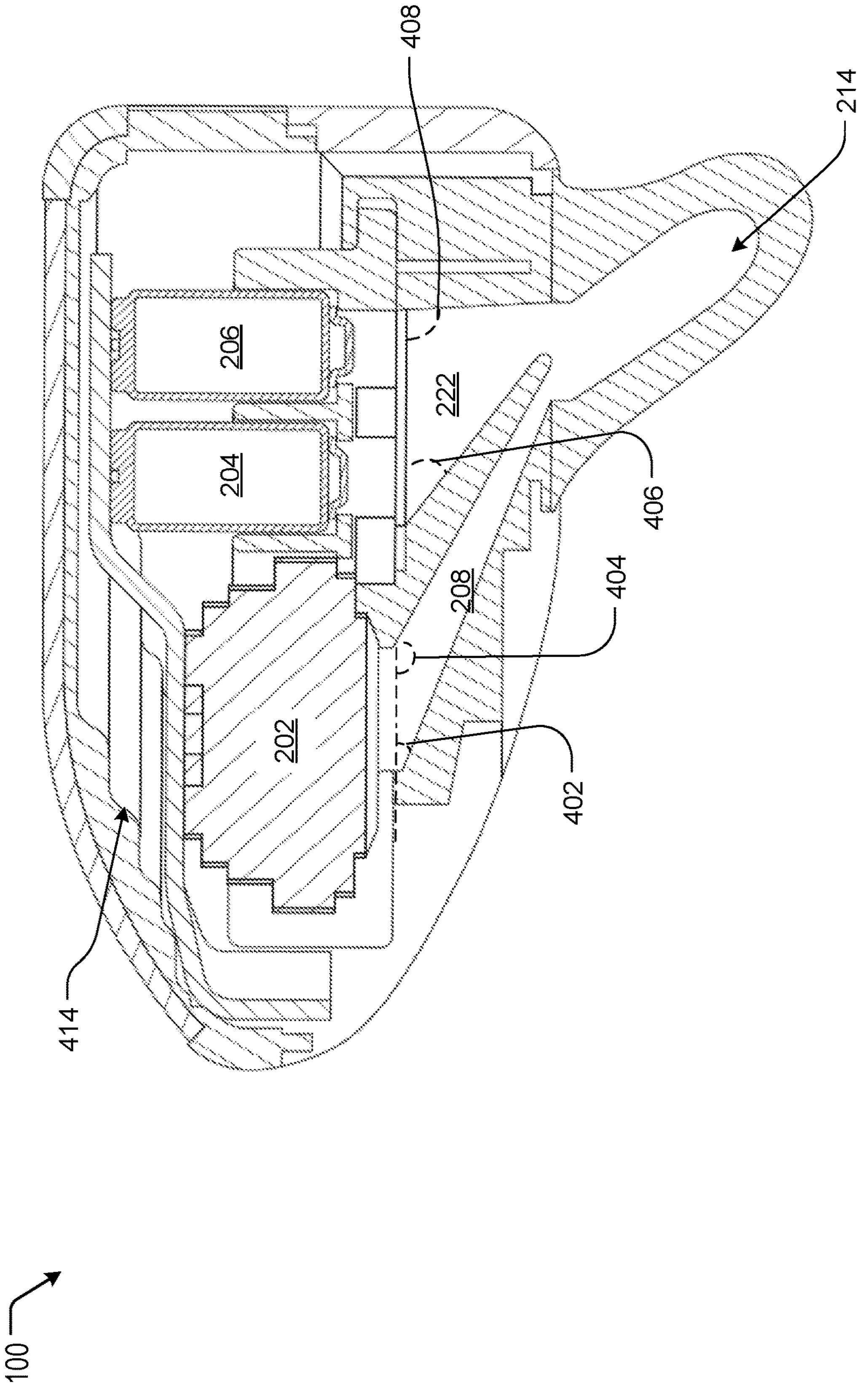
FIG. 4 is an example cross-sectional view of an in-ear audio system, according to some implementations.

FIG. 4 is an example cross-sectional view of an in-ear audio system 100, according to some implementations. Again, as discussed above, the in-ear audio system 100 includes a bass driver 202, a high frequency driver 204, and a mid-frequency driver 206 to, respectively, output sound or acoustic energy into a first waveguide 208 and a second waveguide 222.

In the illustrated example, each of the waveguides 208 and 222 each have various angles with respect to the drivers 202, 204, and 206 that assist in propagating and delivering the acoustic energy or sound to the consolidation zone 214. For instance, the waveguide 208 may include a first angle 402 between a first side surface of the waveguide 208 and the opening at the larger top section close to the bass driver 202. In this example, the first angle 402 may be approximately 20.9 degrees. The waveguide 208 may also include a second angle 404 between a second side surface of the waveguide 208 and the opening at the larger top section. The second angle 404 may be approximately 140.4 degrees. As such, it should be understood, that along the opening at the larger top section of the waveguide 208 the angle between the walls of the waveguide 208 and the opening may vary between approximately 120.9 degrees and approximately 140.4 degrees.

In another example, the second waveguide 222 may include a first angle 406 between a first side surface of the waveguide 222 and the opening at the larger top section close to the high frequency driver 204. In this example, the first angle 406 may be approximately 38.9 degrees. The second waveguide 222 may also include a second angle 408 between a second side surface of the waveguide 222 and the opening at the larger top section. The second angle 408 may be approximately 93.1 degrees. Again, it should be understood that along the opening at the larger top section of the waveguide 222 the angle between the walls of the waveguide 208 and the opening may vary or transition between approximately 38.9 degrees and approximately 93.1 degrees.

Additionally, in the current implementation, the in-ear audio system 100 may include an irregular shape or standing waves, generally indicated by 414. For example, as shown below, a standing waves 414 may be positioned along a cap, as shown, to reduce the possibility of standing waves and, thereby, further reduce any back volume or background noise within the in-ear audio system 100.

Additionally, while FIG. 4 illustrates a second form factor for the in-ear audio system 100, it should be understood, that features of FIG. 4 such as the standing waves 414 may be incorporated or usable in combination with the features of FIGS. 1-3, such as the waveguides 208 and 222.

Figure 5:
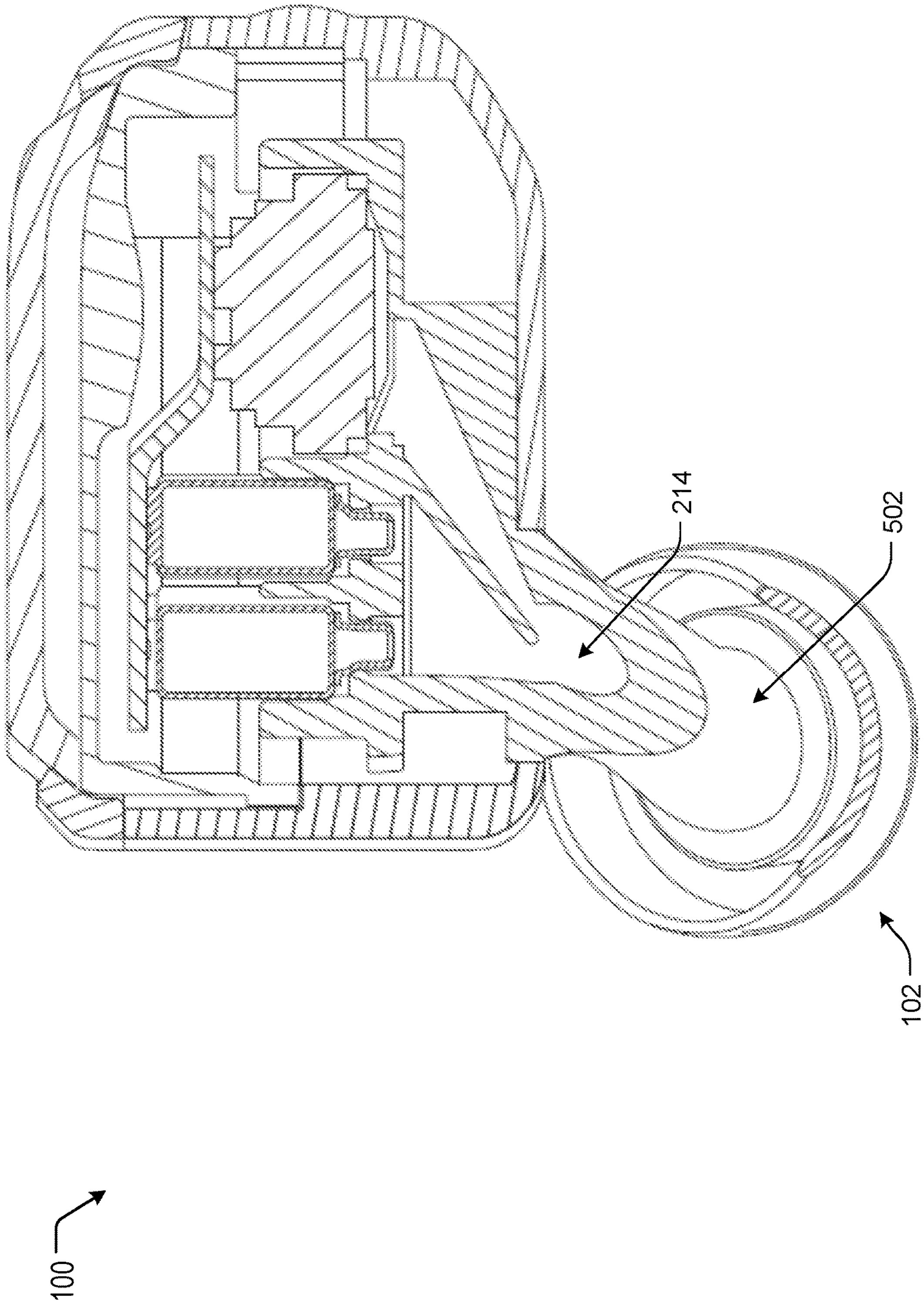
FIG. 5 is an example cross-sectional view of an in-ear audio system, according to some implementations.

FIG. 5 is an example cross-sectional view of an in-ear audio system 100, according to some implementations. In the current example, the consolidation zone 214 may allow the sound or acoustic energy output by the bass driver 202, the high frequency driver 204, and the mid-frequency driver 206 to mix. The consolidation zone 214 may then have a second opening opposite the opening to the drivers 202-206 that is communicatively coupled to a sound tube 502 that delivers the mixed sound or acoustic energy to the earpiece 102 and ultimately to the ear canal of the user as shown.

Figure 6:
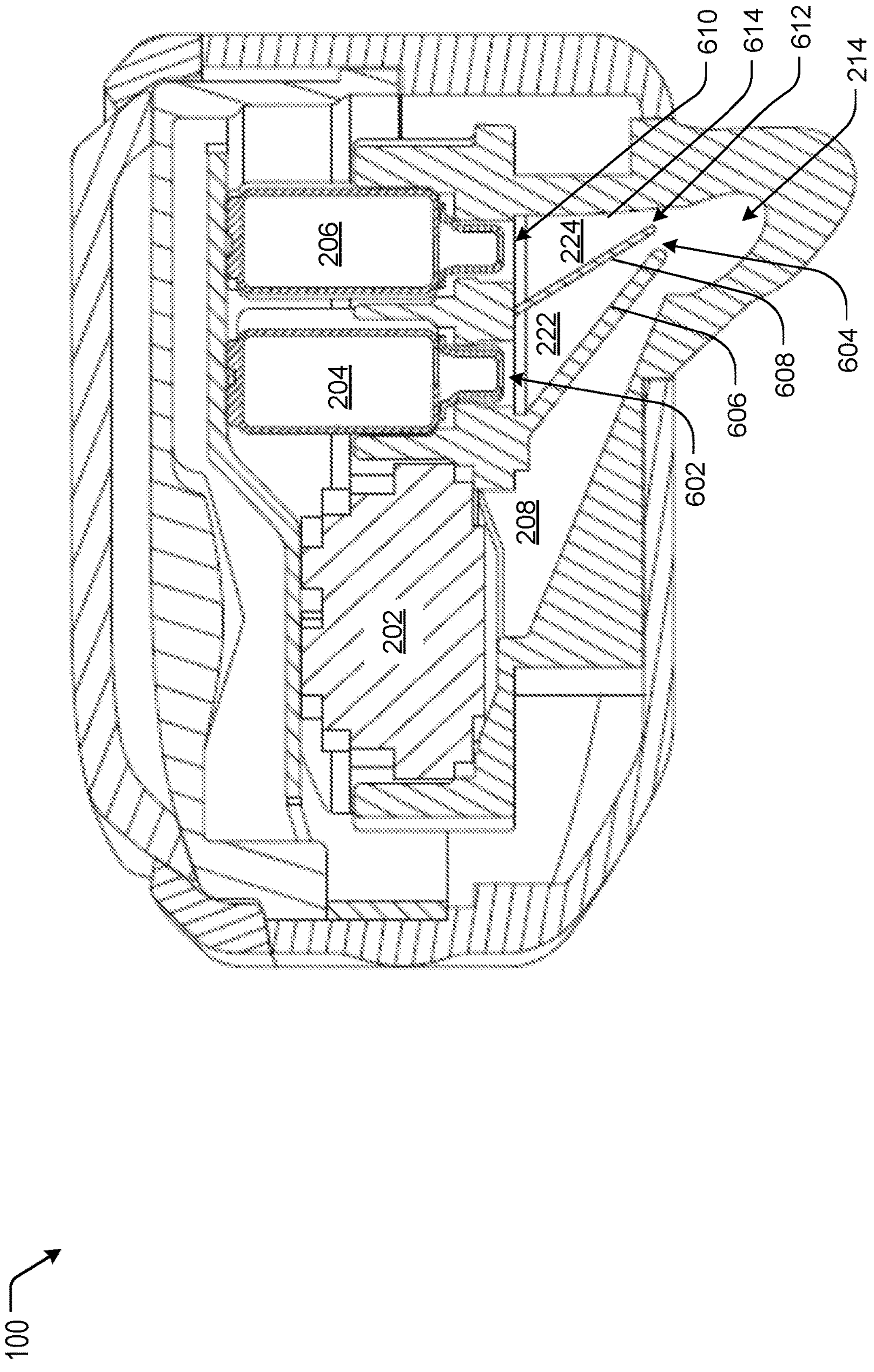
FIG. 6 is an example cross-sectional view of an in-ear audio system, according to some implementations.

FIG. 6 is another example cross-sectional view of an in-ear audio system 100, according to some implementations. As discussed above, the in-ear audio system 100 includes a bass driver 202, a high frequency driver 204, and a mid-frequency driver 206. In this example, the system 100 includes a third waveguide 224 in addition to the waveguides 208 and 222.

In the current example, the second waveguide 222 may be substantially conical and taper in a manner similar to the first waveguide 208. For example, the second waveguide 222 may include a larger top section 602 and a smaller bottom section 604. The larger top section 602 may have a first opening such that the high frequency driver 204 may output the sound or acoustic energy into the second waveguide 222. A diameter of the first opening may be approximately 1.73 mm. Likewise, the smaller bottom section 304 may have a second opening such that the sound or acoustic energy may flow to the consolidation zone 214 to mix with, for instance, the output of the bass driver 202. In the illustrated example, a distance 606 from a point of along the edge of the opening of the larger top section 602 of the waveguide 222 to a point along the opening of the smaller bottom section 604 of the waveguide 222 may be approximately 5.15 mm.

In the illustrated example, the third waveguide 224 may also include a larger top section 610 and a smaller bottom section 612. The larger top section 610 may have a first opening such that the mid-frequency driver 206 may output the sound or acoustic energy into the third waveguide 224. A diameter of the first opening may be approximately 1.63 mm. Likewise, the smaller bottom section 612 of the third waveguide 224 may have a second opening such that the sound or acoustic energy may flow to the consolidation zone 214 to mix with for instance the output of the bass driver 202 and the mid-frequency driver 204. In the illustrated example, a distance 614 from a point of along the edge of the opening of the larger top section 310 of the third waveguide 224 to a point along the opening of the smaller bottom section 312 of the third waveguide 224 may be approximately 3.36 mm.

Figure 7:
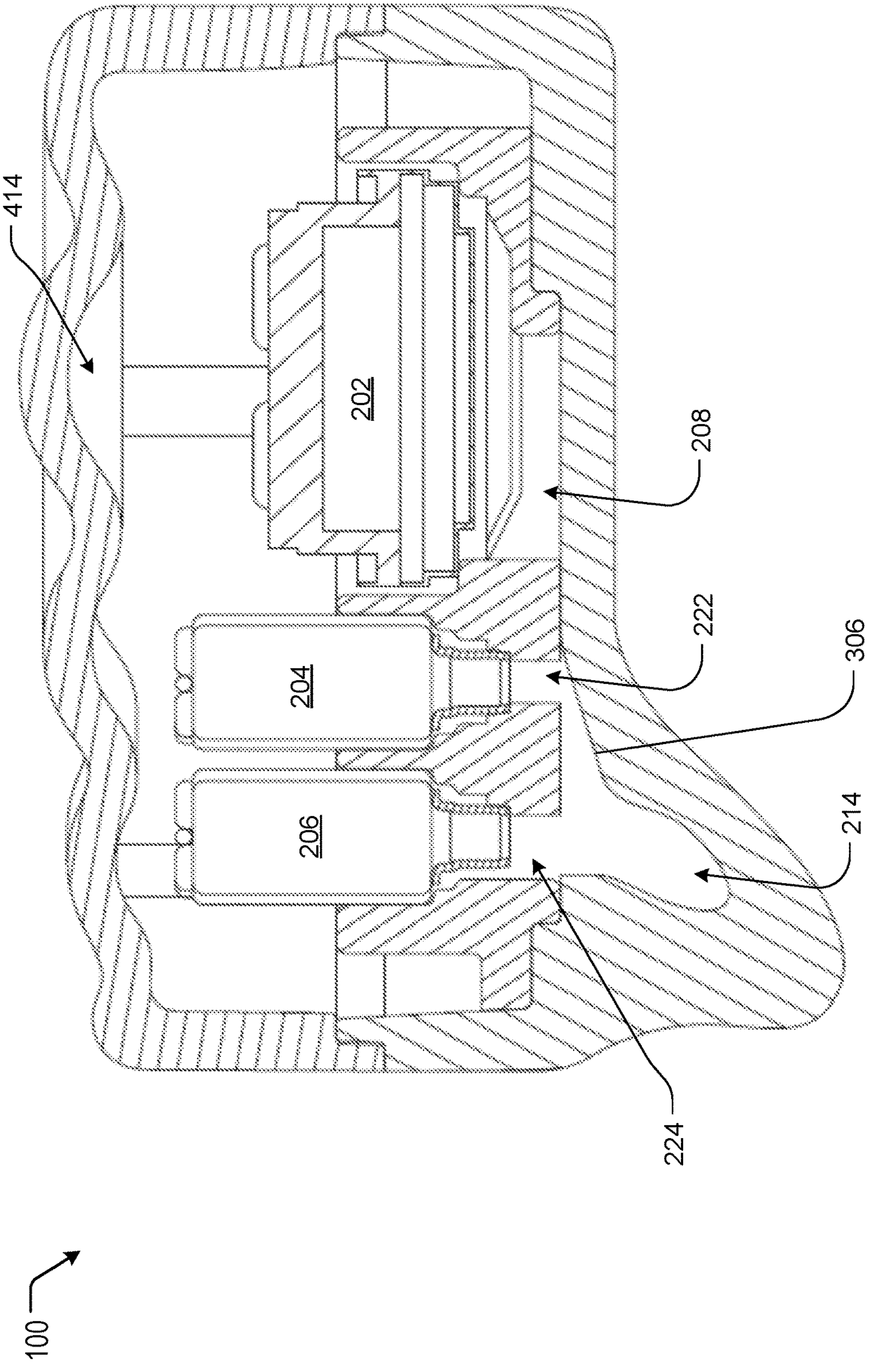
FIG. 7 is an example cross-sectional view of an in-ear audio system, according to some implementations.

FIG. 7 is an example cross-sectional view of an in-ear audio system 100, according to some implementations. In this example, the in-ear audio system 100 includes another form factor that comprise the drivers 202-206, the waveguides 208, 222, and 224, and the consolidation zone 214 to output and deliver the mixed acoustic energy or sound to the user. The cap of the current form factor also includes the standing waves 414 to reduce the possibility of standing waves, back volume, and/or background noise within the in-ear audio system 100.

Figure 8:
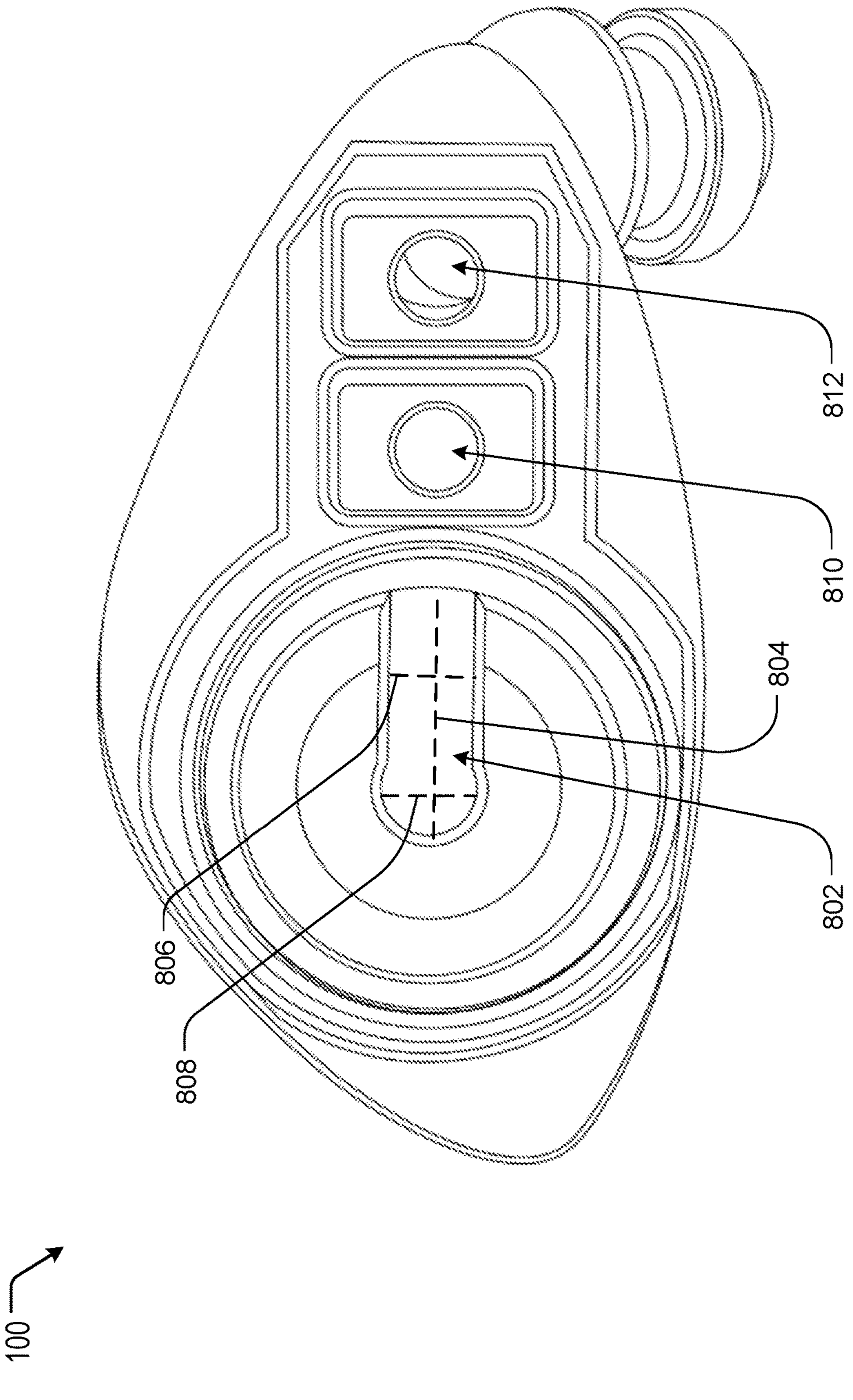
FIG. 8 is an example top down view of an in-ear audio system, according to some implementations.

FIG. 8 is an example top down view of an in-ear audio system 100, according to some implementations. In this example, the opening 802 from the bass driver to the first waveguide may be in the form of a key shape, a circle coupled to a rectangle, or have a longer dimension 804, a smaller dimension 806, and a diameter 808. In this example, the dimension 804 may be approximately 4.51 mm, the smaller dimension 806 may be approximately 1.6 mm, and the diameter 808 may be approximately 1.8 mm. In some cases, the dimension 804 may be between approximately 4.0 mm and 6.0 mm, the dimension 806 may be between approximately 1.1 and 2.1 mm, and the diameter 808 may be between approximately 1.5 mm and 2.1 mm.

In the current example, the high frequency drivers may include a substantially round or circular opening 810 to the second waveguide and the mid-frequency driver may also include a substantially round or circular opening 812 to the second waveguide. The diameter of the opening 810 may be approximately 1.73 mm and the diameter of the opening 812 may be approximately 1.63 mm.

Figure 9:
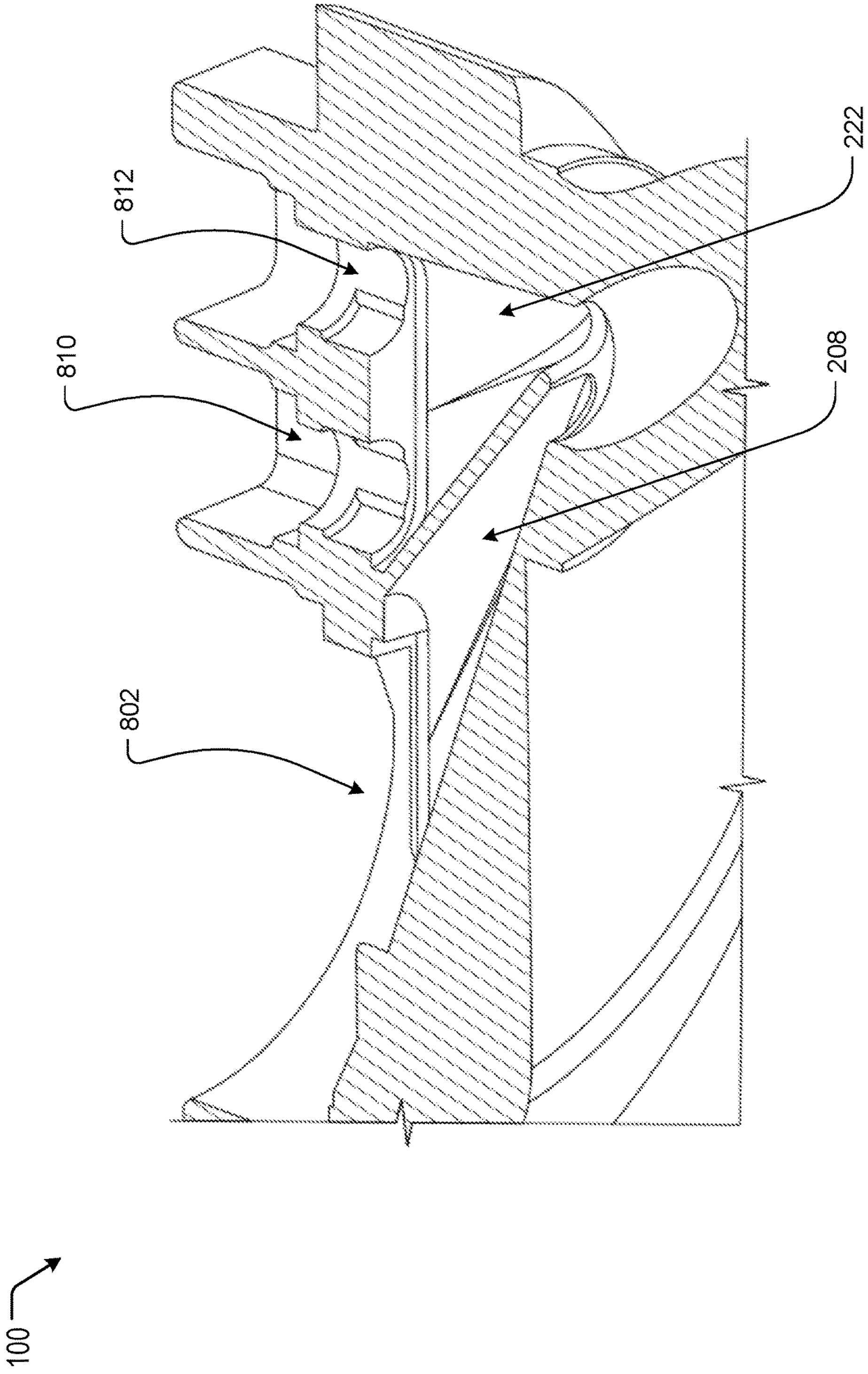
FIG. 9 is another example cross-sectional view of an in-ear audio system, according to some implementations.

FIG. 9 is another example cross-sectional view of an in-ear audio system 100, according to some implementations. In this example, the openings 802, 810, and 812 between the drivers and the waveguides 208 and 222 are illustrated. For example, as shown, the opening 810 and 812 may be substantially circular while the opening 802 has rectangular features.

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:

a first driver to output first acoustic energy within a first frequency band;

a second driver to output second acoustic energy within a second frequency band;

a third driver to output third acoustic energy within a third frequency band;

a first waveguide associated with the first driver, the first waveguide having a larger section with a first top opening positioned to receive the first acoustic energy from the first driver and a smaller section with a first bottom opening positioned to output the first acoustic energy, wherein a cutoff frequency of sound propagating in the first waveguide may be defined as the cutoff frequency equal to a first value divided by a second value, the first value equal to a Bessel function coefficient times a speed of sound propagations and the second value equal to it times a diameter of the first waveguide; and a second waveguide associated with the second driver and the third driver, the second waveguide having a larger section with a second top opening positioned to receive the second acoustic energy from the second driver and the third acoustic energy from the third driver and a smaller section with a second bottom opening positioned to output the second acoustic energy and the third acoustic energy.

2. The device of claim 1, wherein the first waveguide is substantially conical shape.

3. The device of claim 1, further comprising a consolidation zone for mixing the first acoustic energy, the second acoustic energy, and the third acoustic energy.

4. The device of claim 3, wherein:

the consolidation zone is coupled to the bottom opening of the first waveguide at the smaller section; and the consolidation zone is coupled to the bottom opening of the second waveguide at the smaller section.

5. The device of claim 3, further comprising a sound tube communicatively coupled to the consolidation zone at a position opposite the first waveguide and the second waveguide, the sound tube to deliver a mixture of acoustic energy including portions of the first acoustic energy, the second acoustic energy, and the third acoustic energy to an ear canal of a user.

6. The device of claim 1, wherein a frequency range of the first waveguide is between approximately 21 Hz and approximately 20 kHz.

7. The device of claim 6, wherein the first waveguide transmits second harmonics without a cutoff.

8. The device as of claim 1, wherein an angle of a wall of the second waveguide transitions between approximately 39.10 degrees and approximately 94.2 degrees.

9. The device of claim 1, wherein the first driver is a bass driver, the second driver is a mid-frequency driver, and the third driver is a high frequency driver.

10. A system comprising:

a first driver to output first acoustic energy within a first frequency band;

a second driver to output second acoustic energy within a second frequency band;

a first waveguide associated with the first driver, the first waveguide having a first opening positioned to receive the first acoustic energy from the first driver and to output the first acoustic energy, wherein the first waveguide has a first larger section physically proximal to the first driver and a first smaller section opposite the larger section to output the first acoustic energy and an angle between the first top opening and a surface of a wall of the first waveguide is between approximately 21.10 degrees and approximately 41.5 degrees; and a second waveguide associated with the second driver, the second waveguide having a second opening positioned to receive the second acoustic energy from the second driver to output the second acoustic energy.

11. The system of claim 10, further comprising a consolidation zone for receiving the first acoustic energy from the first waveguide and the second acoustic energy from the second waveguide and mixing the first acoustic energy and the second acoustic energy.

12. The system of claim 11, further comprising:

a third driver to output third acoustic energy within a third frequency band; and a third waveguide associated with the third driver having a larger section with a third opening positioned to receive the third acoustic energy from the third driver and a smaller section with a second opening positioned to deliver the third acoustic energy to the consolidation zone; and wherein the consolidation zone mixes the first acoustic energy, the second acoustic energy, and the third acoustic energy.

13. The system of claim 12, wherein the first driver is a bass driver, the second driver is a mid-frequency driver, and the third driver is a high frequency driver.

14. A device comprising:

a first waveguide having a first opening at a first end and a second end, the first waveguide to receive first acoustic energy at the first opening and to propagate the first acoustic energy to the second end, the second end of the first waveguide opposite the first end of the first waveguide, wherein the first waveguide has a substantially conical shape with a first larger section physically proximal to the first opening and a first smaller section physically proximal to the second end and an angle between the first top opening and a surface of a wall of the first waveguide is between approximately 21.10 degrees and approximately 41.5 degrees; and a second waveguide having a first opening at a first end and a second end, the second waveguide to receive second acoustic energy and third acoustic energy at the first opening and to propagate the second acoustic energy and the third acoustic energy to the second end, the second end of the second waveguide opposite the first end of the second waveguide, wherein the second waveguide has a substantially conical shape with a first larger section physically proximal to the first opening and a first smaller section physically proximal to the second end and an angle between the second top opening and a surface of the wall of the second waveguide is between approximately 94.2 degrees and approximately 39.10 degrees.

15. The device of claim 14, further comprising a consolidation zone coupled of the first end of the first waveguide and the first end of the second waveguide, the consolidation zone to allow the first acoustic energy, the second acoustic energy, and the third acoustic energy to mix.

16. The device of claim 14, further comprising:

a first driver to output the first acoustic energy;

a second driver to output the second acoustic energy; and a third driver to output the third acoustic energy.

17. The device of claim 14, wherein an angle of a wall of the second waveguide transitions between approximately 39.10 degrees and approximately 94.2 degrees.

18. The device of claim 15, wherein a side surface of the first waveguide has a length of between approximately 10.54 millimeters and 6.37 millimeters.

19. The system of claim 10, wherein a cutoff frequency of sound propagating in the first waveguide may be defined as the cutoff frequency equal to a first value divided by a second value, the first value equal to a Bessel function coefficient times a speed of sound propagations and the second value equal to it times a diameter of the first waveguide.

20. The device of claim 14, wherein a cutoff frequency of sound propagating in the first waveguide may be defined as the cutoff frequency equal to a first value divided by a second value, the first value equal to a Bessel function coefficient times a speed of sound propagations and the second value equal to it times a diameter of the first waveguide.

* * * * *